US008943283B2

(12) United States Patent
Fiske et al.

(10) Patent No.: US 8,943,283 B2
(45) Date of Patent: Jan. 27, 2015

(54) CONVERTING A FIRST ADDRESS MAPPING FUNCTION FOR MAPPING ADDRESSES TO STORAGE LOCATIONS TO A SECOND ADDRESS MAPPING FUNCTION

(75) Inventors: Rahul Fiske, Pune (IN); Carl E. Jones, Tucson, AZ (US); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 13/601,497

(22) Filed: Aug. 31, 2012

(65) Prior Publication Data

US 2014/0068211 A1    Mar. 6, 2014

(51) Int. Cl.
*G06F 12/00* (2006.01)
*G06F 11/14* (2006.01)

(52) U.S. Cl.
CPC ...... *G06F 11/1456* (2013.01); *G06F 2207/222* (2013.01)
USPC .......................................................... 711/162

(58) Field of Classification Search
None
See application file for complete search history.

(56) References Cited

U.S. PATENT DOCUMENTS

| | | | |
|---|---|---|---|
| 2006/0085471 A1* | 4/2006 | Rajan et al. | 707/102 |
| 2010/0042802 A1* | 2/2010 | Helman et al. | 711/173 |
| 2010/0185814 A1 | 7/2010 | Kano et al. | |
| 2013/0036128 A1* | 2/2013 | Ben-Tsion et al. | 707/756 |

OTHER PUBLICATIONS

"EMC Symmetric V-Max with Veritas Storage Foundation", Symantec, White Paper, May 2009, pp. 1-19.

* cited by examiner

*Primary Examiner* — Duc Doan
(74) *Attorney, Agent, or Firm* — David W. Victor; Konrad Raynes Davda & Victor LLP (57) ABSTRACT

Provided are a computer program product, system, and method for converting a first address mapping function for mapping addresses to storage locations to a second address mapping function. For each of a plurality of addresses allocated in the storage using the first address mapping function, a node is generated in the second address mapping function. Each node in the second address mapping function associates a logical address with a physical location for the logical address. A determination is made of addresses having unused space and storage space is freed for the determined addresses having the unused space. Indication is made in the second address mapping function that the storage space for the determined addresses has been freed.

24 Claims, 4 Drawing Sheets

CONVERTING A FIRST ADDRESS MAPPING FUNCTION FOR MAPPING ADDRESSES TO STORAGE LOCATIONS TO A SECOND ADDRESS MAPPING FUNCTION

BACKGROUND OF THE INVENTION

1. Field of the Invention

The present invention relates to a computer program product, system, and method for converting a first address mapping function for mapping addresses to storage locations to a second address mapping function.

2. Description of the Related Art

In a storage environment, logical addresses may be mapped to physical locations of a volume using a fixed formula where all the storage space and logical addresses are allocated in advance and the fixed formula maps the logical address to a physical location. This fixed formula mapping is used for a thick provisioned volume in which all data for the volume is allocated in advance, even before the logical addresses are used by an application. In a thin provisioned volume, storage space is allocated to a logical address only when the logical addresses are used. In this way, logical addresses are not allocated that point to free or unused space, unlike in a thick provisioned volume where physical space is pre-allocated.

Thin provisioned volumes provide a more space efficient allocation of storage space that is often used in virtual storage systems where storage space is only allocated when needed and space is not wasted by allocating in advance of being used or needed. Thin provisioned volumes may use a B-tree to represent logical address to physical address mapping. If a requested logical address is not represented in the B-tree, then storage space is allocated to the requested logical address and a new leaf node is added to the B-tree for the new logical address that identifies the allocated physical storage space. Some B-trees might have free space in existing nodes, to add mappings, so that a new mapping might not always require a new B-tree node.

It has been reported that in many thick provisioned volumes, on average only 40-45% of the allocated volume is used, resulting in a substantial amount of unused physical spaced allocated and not utilized.

Solutions are provided to migrate a thick provisioned volume to the more space efficient thin provisioned volume. Current solutions first scan the thick provisioned volume being migrated for zeros to determine unused space, and those regions deemed to have free space are not migrated or written to the target provisioned thin volume. The B-tree for the thin provisioned volume is then constructed from the migrated data, which excludes free space, so in the thin provisioned volume only logical addresses pointing to user data are allocated and free space is not allocated.

There is a need in the art for improved techniques for converting an address mapping function that allocates storage space to logical addresses in advance to an address mapping function that does not allocate the storage space until the logical addresses are used.

SUMMARY

Provided are a computer program product, system, and method for converting a first address mapping function for mapping addresses to storage locations to a second address mapping function. For each of a plurality of addresses allocated in the storage using the first address mapping function, a node is generated in the second address mapping function. Each node in the second address mapping function associates a logical address with a physical location for the logical address. A determination is made of addresses having free space and storage space is freed for the determined addresses having the free space. Indication is made in the second address mapping function that the storage space for the determined addresses has been freed.

DETAILED DESCRIPTION

Prior art solutions that use scanning to determine unused space to migrate from the thick provisioned volume to the thin provisioned volume involve an expensive resource intensive operation to scan the entire volume to identify free/unused space. This operation may slow down the migration process and application requests until the scanning operation has completed. Further, if unused regions have not been zeroed out, then the scanning operation may not be able to detect those regions as having free space.

To address these concerns and others, described embodiments provide techniques to change the address mapping scheme used to map logical addresses to physical locations from a first address mapping function, which may pre-allocate storage space to logical addresses in advance, to a second address mapping function, which may allocate storage space to logical addresses only when the logical address is needed by an application. With described embodiments, after generating a second address mapping function having nodes for all logical addresses allocated according to the first logical mapping function, a determination is made of logical addresses having free space (by an application using the volume). Commands may then be issued to deallocate those logical addresses addressing free space to return the free space to a free space storage pool and remove the nodes from the second address mapping function for the deallocated logical addresses.

Figure 1:
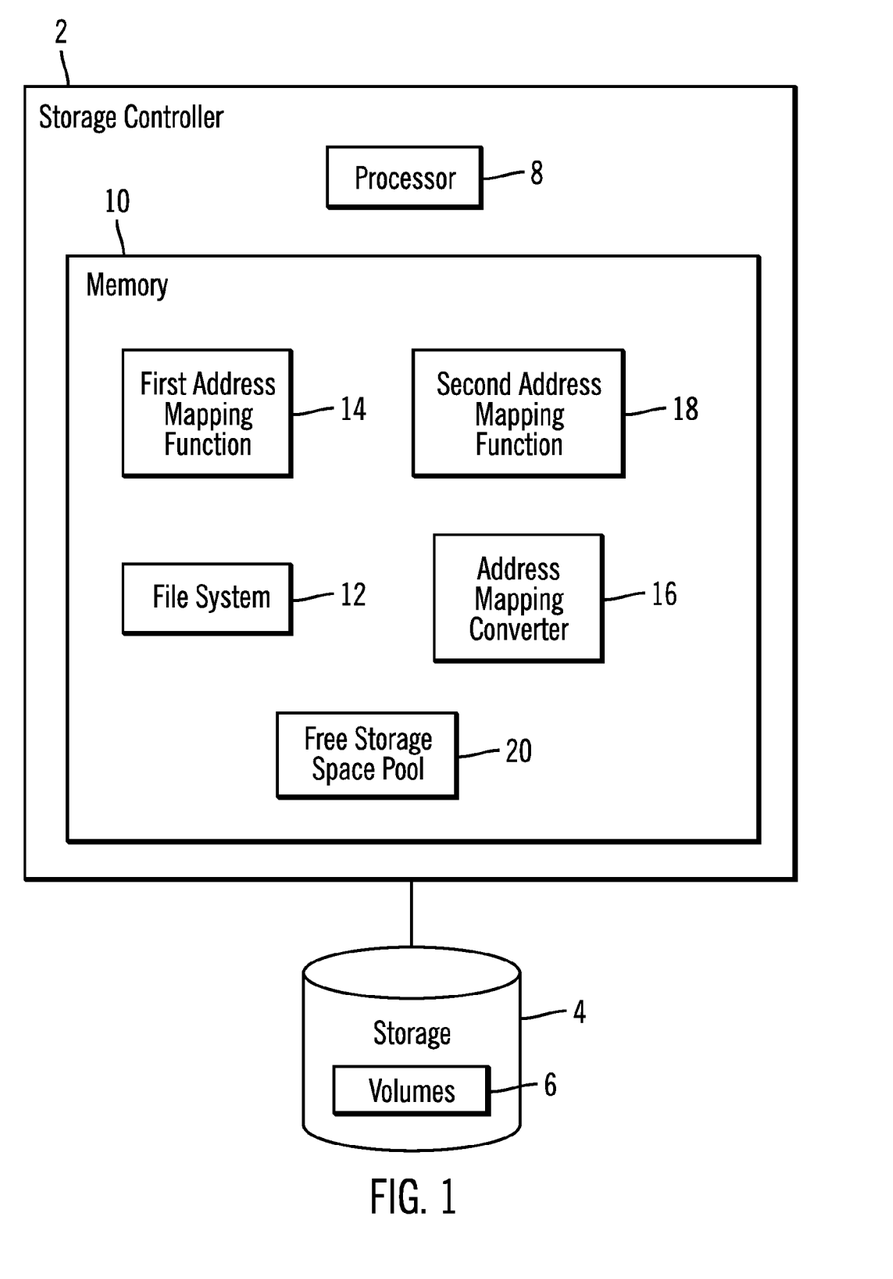
FIGS. 1 and 2 illustrate embodiments of a storage environment.

FIG. 1 illustrates an embodiment of a storage environment in which a storage controller 2 manages access to a storage 4 in which volumes 6 are configured. The storage controller 2 includes a processor 8 and a memory 10. The memory includes 10 a file system 12 providing information on files and data objects stored in volumes 6 in the storage 4.

Initially, a first address mapping function 14 is used to map logical addresses to physical locations in the storage 4. In one embodiment, the first address mapping function 14 uses a fixed formula to map logical addresses to fixed addresses such that all logical addresses are allocated in the storage 4 in advance before being accessed. This fixed formula may be determined based on the configuration of the underlying volume 6, e.g., stripe, Redundant Array of Independent Disks (RAID) 5, RAID 6, etc. For example, if there is a stripe volume created out of three physical disks and the stripe size is 24 MB, each disk contains 8 MB of data for a specific stripe. The fixed formal may then map the physical LBA corresponding to start virtual LBA=18 MB to physical disk 3 starting at offset 2 MB on that physical disk. In further embodiments, the fixed formal may be more complex depending on the underlying configuration.

The memory 10 further includes an address mapping convertor 16 comprising a program to convert the first address mapping function 14 used to determine storage locations in storage 4 for the logical addresses to a second address mapping function 18. In certain embodiments, the second address mapping function 18 my implement a tree structure, such as a B-tree data structure, where the nodes that map logical addresses to physical locations comprise leaf nodes. In alternative embodiments, other tree structures may be used. In certain embodiments, the second address mapping function 18 only allocates logical addresses and storage space when they are requested and needed.

The storage controller 2 may maintain a free storage space pool 20 identifying storage space in the storage 4 available for allocation to logical addresses. In this way, storage space is not allocated in advance to logical addresses and free storage space is maintained in the free storage space pool 20 available for allocation to logical addresses. When a logical address is added to the second address mapping function 18 when requested for the first time, i.e., in response to an access request to the logical address, storage space from the free storage space pool 20 may be allocated to the requested logical address. After the address mapping convertor 16 converts the address mapping to the second address mapping function 18, the second address mapping function 18 only includes nodes for logical addresses having user data, no nodes for free space, and going forward storage space is only allocated to a logical address in response to an access request to the logical address.

Figure 2:
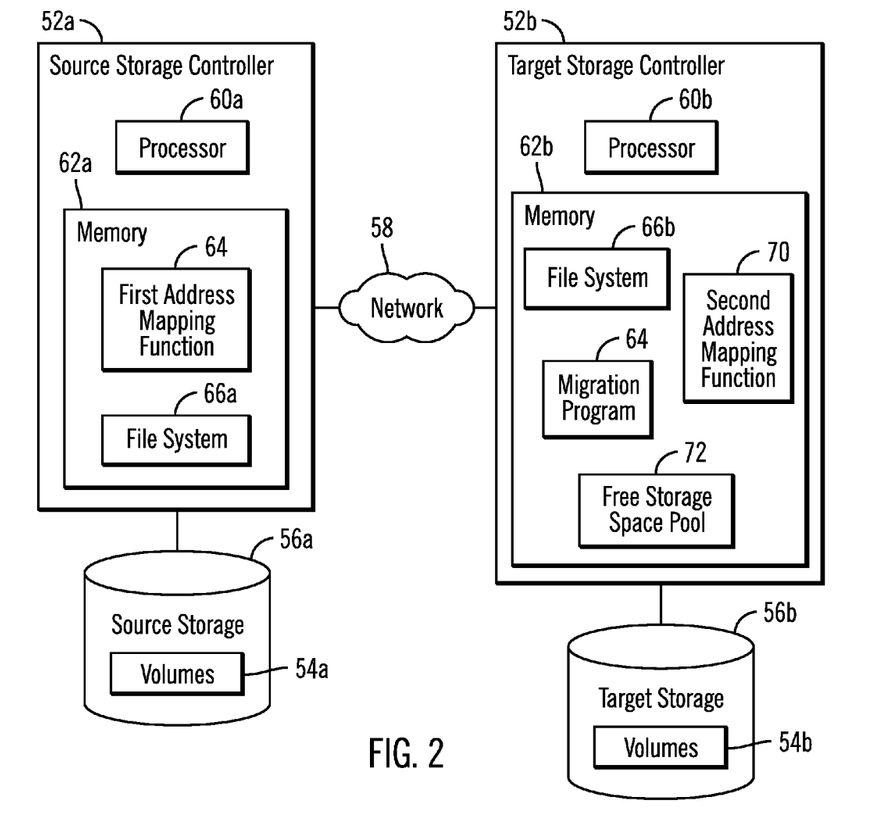

FIG. 2 illustrates an alternative embodiment where a source storage controller 52a manages volumes 54a in a source storage 56a that are migrated over a network 58 to a target storage controller 52b to store as volumes 54b in a target storage 56b. The storage controllers 52a, 52b each include a processor 60a, 60b and a memory 62a, 62b including programs and data structures processed by the processor 60a, 60b. The source memory 56a includes a first address mapping function 64 used to map logical addresses to storage locations in the source storage 56a and a file system 66a providing information on the data stored in the source storage 56a volumes 54a, including metadata, free space regions, etc. The first address mapping function 64 may use a fixed formula for allocating physical space to logical addresses and allocate logical addresses in advance of being used, such as in a thick provisioned volume. Although the migration program 64 is shown as implemented in the target storage controller 52b, in additional embodiments it may be implemented and executed in the source storage controller 52a.

The target memory 62b includes a migration program 68 to migrate source volumes 54a to target volumes 54b in the target storage 56b. The migration program 64 may build a target file system 66b for the volume being migrated from the metadata information in the source file system 66a. The target memory 62b further maintains a second address mapping function 70 which has nodes mapping logical addresses to storage, where storage is allocated from a free space storage pool 72 of available space in the target storage 56b allocated when a logical address is requested, i.e., a thin provisioned volume. In certain embodiments, the second address mapping function 70 may comprise a B-tree or other tree structure.

The storage controllers 2, 52a, 52b may comprise storage controllers and enterprise storage servers known in the art. The storages 4, 56a, 56b may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The storages 4, 56a, 56b may store tracks in a Redundant Array of Independent Disks (RAID) configuration where strides of tracks are written across multiple storage devices comprising the storages 4, 56a, 56b. Strides comprise tracks written across disks in a RAID rank, where a stride of track includes data and parity information calculated form the data in the stride striped across the storage devices. A RAID rank comprises a group of storage devices configured to work as a RAID set, such that the stride of tracks, including data and parity tracks, are striped across the storage devices in the RAID rank. The storages 4, 56a, 56b may include one or more configured RAID ranks.

The memories 10, 62a, 62b may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The network 58 may comprise a network such as a Local Area Network (LAN), Storage Area Network (SAN), Wide Area Network (WAN), peer-to-peer network, wireless network, etc. Further the network 58 may be separated into separate networks between the controllers 52a, 52b.

The storages 4, 56a, 56b may be connected to their respective storage controllers 2, 52a, 52b by a direct line connection or over a network.

The address mapping converter 16 and migration program 64 may be implemented in programs in memory 10, 62b executed by a processor 8, 60b, such as shown in FIGS. 1 and 2. Alternatively, the programs 16 and 64 may be implemented, in whole or in part, with hardware logic, such as an Application Specific Integrated Circuit (ASIC), Field Programmable Gate Array (FPGA), etc. or firmware in the storage controller 2, 52b

Further, in described embodiments the functionality to convert the address mapping from the first 14, 64 to the second 18, 70 address mapping function may be delivered to the storage controllers 2, 52a, 52b by updating firmware and/or software in the storage controllers 2, 52b to include the functionality of the programs 16, 64. In redundant storage controller configurations, one controller may be updated first and the other redundant controller updated subsequently to provide a non-disruptive upgrade of the address mapping functionality of the storage controllers.

Figure 3:
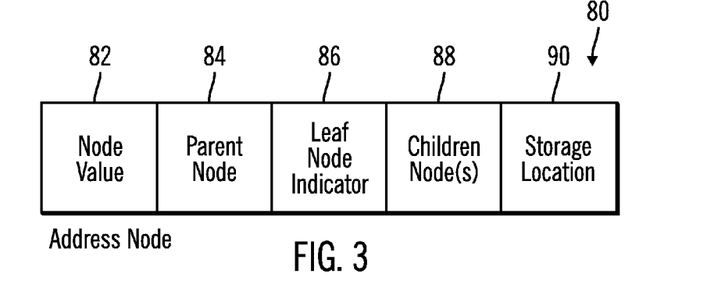
FIG. 3 illustrates an embodiment of an address node in an address mapping function that only allocates storage space to logical addresses when needed.

FIG. 3 illustrates an embodiment of a node 80 in the second address mapping function 18, 70 of how a logical address maps to a physical location in a b-tree address mapping function. The node 80 includes a node value 82 identifying the node and which may comprises a portion of the logical address represented by the node 80; a parent node 84 to the node 80; a leaf node indicator 86 indicating whether the node is an intermediary node or a leaf node; zero or more children nodes 88; and a storage location 90 if the node is a leaf node. The logical address comprises the node values of all nodes that are traversed to reach a leaf node representing the logical address. A node 80 for a logical address is inserted in the second address mapping function 18, 70, such as a B-tree, when an application requests a logical address and the B-tree does not have an entry for that requested address.

Figure 4:
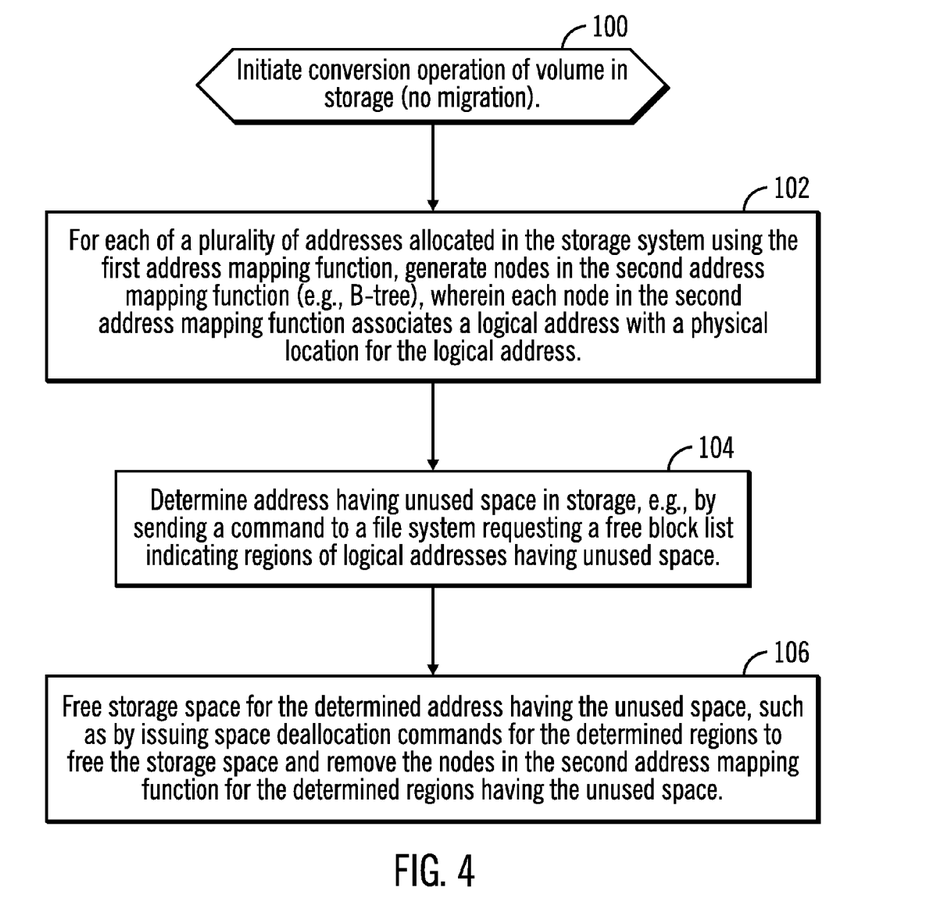
FIGS. 4 and 5 illustrate embodiments of operations to convert a first address mapping function used to allocate logical addresses in a storage to a second address mapping function.

FIG. 4 illustrates an embodiment of operations, initiated at block 100, performed by the address mapping converter 16 (FIG. 1) to convert a first address mapping function 14, e.g., fixed formula for address mapping to pre-allocated storage, to a second address mapping function 18, e.g., B-tree mapping of storage in a storage pool, when the data remains stored in the same storage 4. The address mapping converter 16 generates the second address mapping function 70, such as a B-tree of nodes 80, to represent the logical addresses allocated in the volume 6 being converted. In certain embodiments, the same addresses used in the first address mapping function 14 are created in the second address mapping function 18. For each of a plurality of addresses in the volume 6 allocated in the storage 4 using the first address mapping function 14, the address mapping converter 16 generates (at block 102) a node 80 in the second address mapping function (e.g., B-tree), wherein each node in the second address mapping function associates a logical address with a physical location for the logical address. In generating the node for each logical address, the address mapping converter 16 may generate intermediary nodes and leaf nodes, where the leaf node would represent the logical address. Because all logical addresses allocated in the entire volume 6 are being represented in the second address mapping function 18, the logical addresses represented in the second addressing mapping function 18, e.g., B-tree, may address free or empty space, which was space allocated in the first address mapping function 14, but not yet used or deleted.

The address mapping converter 16 determines (at block 104) addresses in the second address mapping function 18 having free space in the volume 6. In certain embodiments, this may be done by sending a command to the file system 12 requesting a free block list indicating regions of logical addresses having free space. For instance, the converter 16 may use an application programming interface (API) such as "return_list_of_free_blocks (device ID, pointer_to_list_of_free_regions)" and the returned "pointer_to_list_of_free_regions" may specify one or more start logical addresses, e.g., logical block addresses (LBAs) and a byte size or length of the region of free space. In alternative embodiments, the logical addresses having free space may be determined from an application other than the file system 12, such as from a database which returns a list of unused records. Other tracking mechanisms may be used to determine logical addresses addressing free space. For instance, the International Business Machines Corporation ("IBM") XIV® Storage System deploys a WRITE track mechanism for thick provisioned volumes to find regions of the volume that have unused space. (XIV and IBM are registered trademarks of International Business Machines Corporation in the United States and other countries).

The address mapping converter 16 frees (at block 106) the storage space for the determined address having the free space. In one embodiment, the converter 16 may issue space deallocation commands for the determined regions to free the storage space and remove the nodes in the second address mapping function 18 for the determined regions having the free space. For example, a space deallocation command such as a Small Computer System ("SCSI") UNMAP and WRITE (ZEROS) commands may be used to free the space and return the freed space to a free storage pool.

After deallocating space and removing nodes, the storage 4 space addressed by the removed nodes is indicated in the free storage space pool 20 where it is available for later allocations to logical addresses requested that are not represented as nodes 80 in the second address mapping function 18.

Figure 5:
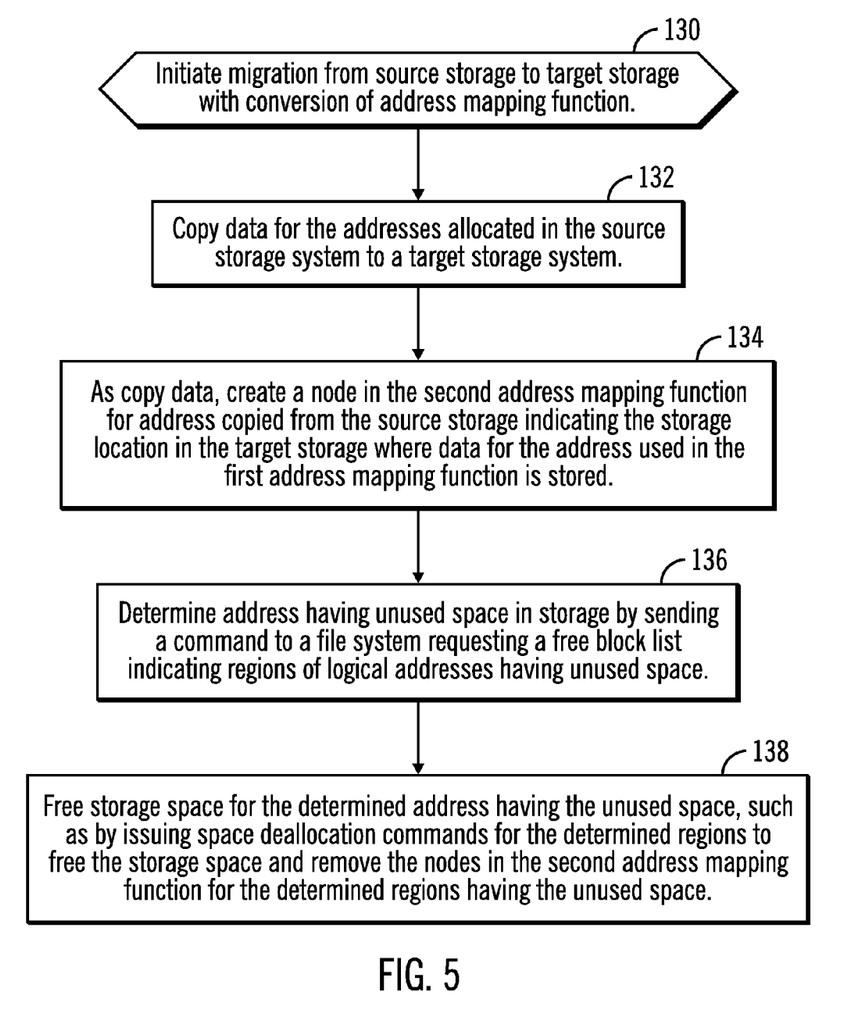

FIG. 5 illustrates an embodiment of operations performed by the migration program 64 with respect to FIG. 2 to convert a volume migrated from a source storage 56a, in which the first address mapping function 64 was used, e.g., fixed formula, to a volume 54b in the target storage 56b using the second address mapping function 70. Upon initiating (at block 130) a migration from a source storage 56a volume 54a to a target storage 56b volume 54b, the migration program 64 copies (at block 132) data, e.g., the volume 54a, for the addresses allocated in the source volume 54a to the target volume 54b in the target storage system 56b.

The migration program 64 creates (at block 134) a node in the second address mapping function for address copied from the source volume 54a indicating the storage location in the target volume 54b where data for the address used in the first address mapping function is stored. Because the source volume 54a had addresses allocated according to the first address mapping function 54, where all logical addresses are allocated in advance, i.e., thick provisioned, the second address mapping function 70 would have nodes 80 for addresses having user data as well as free space. Further, the migration program 64 may construction a file system 66b for the migrated data. This operation of generating the second address mapping function 70 may be performed instantaneously because physical storage of the volume 56b space has already been allocated and each node 80 in the address mapping function 70 may point to a pre-allocated region. The result of operation 134 is an initial fully populated second address mapping function 70 for all addresses in the migrated volume 54a, such as a fully populated B-tree.

The migration program 64 may then determine (at block 136) addresses having free space in the volume 54b. In one embodiment, the migration program 64 may send a command to a file system requesting a free block list indicating regions of logical addresses having free space, such as described with respect to block 104 in FIG. 4. The migration program may free (at block 138) storage space for the determined addresses having the free space. The freed storage space may be indicated in the free storage space pool 72 used by the target storage controller 52b to allocate new space to logical addresses. In one embodiment, space may be freed by issuing space deallocation commands for the determined regions to free the storage space and remove the nodes 80 in the second address mapping function 70 for the determined regions having the free space, such as described with respect to block 106 in FIG. 4.

Using migration to convert a thick provisioned volume in a source storage to a thin provisioned volume may be useful in situations where the source storage controller 52a does not have the capability to generate a second address mapping function, e.g., B-tree, that only allocates storage space to logical addresses when the logical address is requested by an application. Further, the migration operation may also be suitable when the source storage controller does not support space deallocation APIs to deallocate space for logical addresses pointing to unused data and return to a free storage space.

Described embodiments provide techniques for converting the address mapping function used by a volume from a fixed formula type allocation where all logical addresses in the volume are allocated in advance to an address mapping that only allocates logical addresses and storage space when needed.

Described embodiments build a second address mapping function, such as a tree of nodes, to represent the volume mapped according to the second address mapping function, and then issues commands to free logical addresses addressing free storage space. In this way, the resulting second address mapping function only has nodes for logical addresses pointing to used data so that any storage having free space is deallocated and returned to an available space storage pool.

With the described embodiments, a thick provisioned volume may be converted to a thin provisioned volume where free space is freed, resulting in a substantial amount of storage space being made available. Freed storage space may be returned to a free storage pool used by the storage controller to assign storage space to newly provisioned logical addresses. Further, the conversion process is almost instantaneous because the second address mapping function is created from the pre-allocated volume to be fully populated.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for converting a storage using a first address mapping function to use a second address mapping function, the computer program product comprising a computer readable storage medium having computer readable program code embodied therein that executes to perform operations, the operations comprising:
    initiating an operation to convert the first address mapping function to the second address mapping function, wherein the first address mapping function uses a first address mapping scheme to map logical addresses to physical addresses that is different from a second address mapping scheme used by the second address mapping function to map logical addresses to physical addresses; and
    in response to initiating the operation to convert, perform operations comprising:
        for each of a plurality of addresses allocated in the storage using the first address mapping function, generating nodes in the second address mapping function, wherein each of the nodes in the second address mapping function associates a logical address with a physical location for the logical address;
        determining addresses having unused space in the second address mapping function;
        freeing storage space for the determined addresses having the unused space; and
        indicating in the second address mapping function that the storage space for the determined addresses has been freed.

2. The computer program product of claim 1, wherein the indicating in the second address mapping function that the storage space has been freed comprises:
    removing the nodes in the second address mapping function for the determined addresses having the unused space.

3. The computer program product of claim 1, wherein the second address mapping function comprises a B-tree data structure, and wherein the nodes comprise leaf nodes of the B-tree.

4. The computer program product of claim 3, wherein the first address mapping function provides a fixed formula to map logical addresses to fixed addresses such that all logical addresses are allocated in the storage in advance before being accessed.

5. The computer program product of claim 1, wherein the first address mapping function allocates all addresses in a volume of the storage before they are used and wherein after the generating of the nodes and removing of the nodes pointing to unused space, the second address mapping function only allocates addresses in the volume in response to an access of the address.

6. The computer program product of claim 1, wherein the storage comprises a source storage, wherein the operations further comprise:
    copying data from the addresses allocated in the source storage to a target storage, wherein the nodes in the second address mapping function map the addresses allocated in the source storage to physical locations in the target storage, wherein the freeing the storage space is performed with respect to the target storage.

7. The computer program product of claim 6, wherein a source storage controller manages access to the source storage and wherein a target storage controller manages access to the target storage, wherein the target storage controller provides space deallocation commands not supported on the first storage controller or the source storage controller does not include a capability to generate the second address mapping function.

8. The computer program product of claim 7, wherein the freeing the storage space comprises:
    issuing a space deallocation command for each indicated region having unused space to free the storage space addressed by logical addresses in each region and return the freed storage space to an available storage pool.

9. The computer program product of claim 1, wherein the second address mapping function maps the logical addresses to the physical locations in the source storage to which the first address mapping function mapped the logical addresses.

10. The computer program product of claim 1, wherein the determining the addresses having unused space comprises:
    sending a command to a file system requesting a free block list indicating regions of logical addresses having unused space, wherein the determined addresses having unused space are within the indicated regions.

11. A system in communication with a storage comprising:
    a processor; and a computer readable storage medium having program code executed by the processor to perform operations, the operations comprising:

initiating an operation to convert a first address mapping function to a second address mapping function, wherein the first address mapping function uses a first address mapping scheme to map logical addresses to physical addresses that is different from a second address mapping scheme used by the second address mapping function to map logical addresses to physical addresses; and     in response to initiating the operation to convert, perform operations comprising:

for each of a plurality of addresses allocated in the storage using the first address mapping function, generating nodes in the second address mapping function, wherein each node in the second address mapping function associates a logical address with a physical location for the logical address;

determining addresses having unused space in the second address mapping function;

freeing storage space for the determined addresses having the unused space; and         indicating in the second address mapping function that the storage space for the determined addresses has been freed.

12. The system of claim 11, wherein the indicating in the second address mapping function that the storage space has been freed comprises:

removing the nodes in the second address mapping function for the determined addresses having the unused space.

13. The system of claim 11, wherein the first address mapping function allocates all addresses in a volume of the storage before they are used and wherein after the generating of the nodes and removing of the nodes pointing to unused space, the second address mapping function only allocates addresses in the volume in response to an access of the address.

14. The system of claim 11, wherein the storage comprises a source storage and wherein the system is further in communication with a target storage, wherein the operations further comprise:

copying data from the addresses allocated in the source storage to the target storage, wherein the nodes in the second address mapping function map the addresses allocated in the source storage to physical locations in the target storage, wherein the freeing the storage space is performed with respect to the target storage.

15. The system of claim 14, wherein a source storage controller manages access to the source storage and wherein a target storage controller manages access to the target storage, wherein the target storage controller provides space deallocation commands not supported on the first storage controller or the source storage controller does not include a capability to generate to the second address mapping function.

16. The system of claim 15, wherein the freeing the storage space comprises:

issuing a space deallocation command for each indicated region having unused space to free the storage space addressed by logical addresses in each region and return the freed storage space to an available storage pool.

17. The system of claim 11, wherein the determining the addresses having unused space comprises:

sending a command to a file system requesting a free block list indicating regions of logical addresses having unused space, wherein the determined addresses having unused space are within the indicated regions.

18. A method implemented in a computer system for converting a storage using a first address mapping function to use a second address mapping function, comprising:

initiating an operation to convert the first address mapping function to the second address mapping function, wherein the first address mapping function uses a first address mapping scheme to map logical addresses to physical addresses that is different from a second address mapping scheme used by the second address mapping function to map logical addresses to physical addresses; and     in response to initiating the operation to convert, perform operations comprising:

for each of a plurality of addresses allocated in the storage using the first address mapping function, generating nodes in the second address mapping function, wherein each node in the second address mapping function associates a logical address with a physical location for the logical address;

determining addresses having unused space in the second address mapping function;

freeing storage space for the determined addresses having the unused space; and         indicating in the second address mapping function that the storage space for the determined addresses has been freed.

19. The method of claim 18, wherein the indicating in the second address mapping function that the storage space has been freed comprises:

removing the nodes in the second address mapping function for the determined addresses having the unused space.

20. The method of claim 18, wherein the first address mapping function allocates all addresses in a volume of the storage before they are used and wherein after the generating of the nodes and removing of the nodes pointing to unused space, the second address mapping function only allocates addresses in the volume in response to an access of the address.

21. The method of claim 18, wherein the storage comprises a source storage, further comprising:

copying data from the addresses allocated in the source storage to a target storage, wherein the nodes in the second address mapping function map the addresses allocated in the source storage to physical locations in the target storage, wherein the freeing the storage space is performed with respect to the target storage.

22. The method of claim 21, wherein a source storage controller manages access to the source storage and wherein a target storage controller manages access to the target storage, wherein the target storage controller provides space deallocation commands not supported on the first storage controller or the source storage controller does not include a capability to generate the second address mapping function.

23. The method of claim 22, wherein the freeing the storage space comprises:

issuing a space deallocation command for each indicated region having unused space to free the storage space addressed by logical addresses in each region and return the freed storage space to an available storage pool.

24. The method of claim 18, wherein the determining the addresses having unused space comprises:

sending a command to a file system requesting a free block list indicating regions of logical addresses having unused space, wherein the determined addresses having unused space are within the indicated regions.

* * * * *